US012563276B1

(12) United States Patent
Nandy et al.

(10) Patent No.: US 12,563,276 B1
(45) Date of Patent: Feb. 24, 2026

(54) CLIP GENERATION SERVICE FOR STREAMING CLIP GENERATION

(71) Applicant: Amazon Technologies, Inc., Seattle, WA (US)

(72) Inventors: Kaustav Nandy, Bengaluru (IN); Yash Pandya, Navi Mumbai (IN); Shivam Agarwal, Agra (IN)

(73) Assignee: Amazon Technologies, Inc., Seattle, WA (US)

( * ) Notice: Subject to any disclaimer, the term of this patent is extended or adjusted under 35 U.S.C. 154(b) by 111 days.

(21) Appl. No.: 18/227,135

(22) Filed: Jul. 27, 2023

(51) Int. Cl.
| | |
|---|---|
| *H04N 21/85* | (2011.01) |
| *G06V 10/82* | (2022.01) |
| *G06V 20/40* | (2022.01) |
| *H04N 21/433* | (2011.01) |
| *H04N 21/44* | (2011.01) |
| *H04N 21/8549* | (2011.01) |

(52) U.S. Cl.
CPC ......... *H04N 21/8549* (2013.01); *G06V 10/82* (2022.01); *G06V 20/44* (2022.01); *H04N 21/4331* (2013.01); *H04N 21/44008* (2013.01)

(58) Field of Classification Search
USPC .................................................. 386/248, 278
See application file for complete search history.

(56) References Cited

U.S. PATENT DOCUMENTS

| | | | | |
|---|---|---|---|---|
| 7,732,743 | B1 * | 6/2010 | Buchin ................... | H04N 23/75 |
| | | | | 250/214.1 |
| 10,248,866 | B1 * | 4/2019 | Cotoros ................. | G06V 40/19 |

| | | | | |
|---|---|---|---|---|
| 12,067,755 | B1 * | 8/2024 | Nan ..................... | G06F 3/04842 |
| 2011/0029922 | A1 * | 2/2011 | Hoffberg .......... | H04N 21/44008 |
| | | | | 715/811 |
| 2012/0017232 | A1 * | 1/2012 | Hoffberg .................. | F24F 11/30 |
| | | | | 725/9 |
| 2016/0225410 | A1 * | 8/2016 | Lee ................... | H04N 21/26258 |
| 2016/0322078 | A1 * | 11/2016 | Bose ................ | G11B 20/10527 |
| 2019/0110112 | A1 * | 4/2019 | Maloney ................ | G06V 20/42 |
| 2019/0356948 | A1 * | 11/2019 | Stojancic .............. | G06V 20/48 |
| 2020/0110941 | A1 * | 4/2020 | Lee ........................ | G06V 20/42 |
| 2021/0287012 | A1 * | 9/2021 | Li .......................... | G11B 27/28 |
| 2022/0108727 | A1 * | 4/2022 | van Welzen ......... | G11B 27/036 |
| 2022/0319173 | A1 * | 10/2022 | Ricciardi .............. | G06V 20/46 |
| 2023/0013988 | A1 * | 1/2023 | Kalathuru .............. | G06F 18/21 |

(Continued)

*Primary Examiner* — Nigar Chowdhury

(74) *Attorney, Agent, or Firm* — Kilpatrick Townsend & Stockton LLP

(57) ABSTRACT

A clip generation service can be used to generate streaming video clips. A video segment having video frames can be received from a video stream. Machine-learning models can be executed to determine likelihoods of each of the video frames representing (i) an event, (ii) potential temporal boundaries, and (iii) redundancies with respect to other video frames. A clip generation service can determine a video clip based at least in part on the determined likelihoods. The video clip can include (i) a first video frame being an initial temporal boundary of the video clip, (ii) a second video frame being a terminating temporal boundary of the video clip, and (iii) a third video frame being temporally between the first video frame and the second video frame. The third video frame may represent an event detected by the machine-learning models. Access to the video clip can be facilitated upon request.

19 Claims, 6 Drawing Sheets

(56) References Cited

U.S. PATENT DOCUMENTS

2023/0260552 A1\*   8/2023  Bose ..................... H04N 5/765
                                                   463/31
2023/0319366 A1\*  10/2023  Xuan ................ H04N 21/8405
2024/0371162 A1\*  11/2024  Biswas ................ G06F 18/214
2024/0412515 A1\*  12/2024  Yao ........................ G06V 10/82
2025/0014340 A1\*   1/2025  Kalathuru .............. G06F 18/21

\* cited by examiner

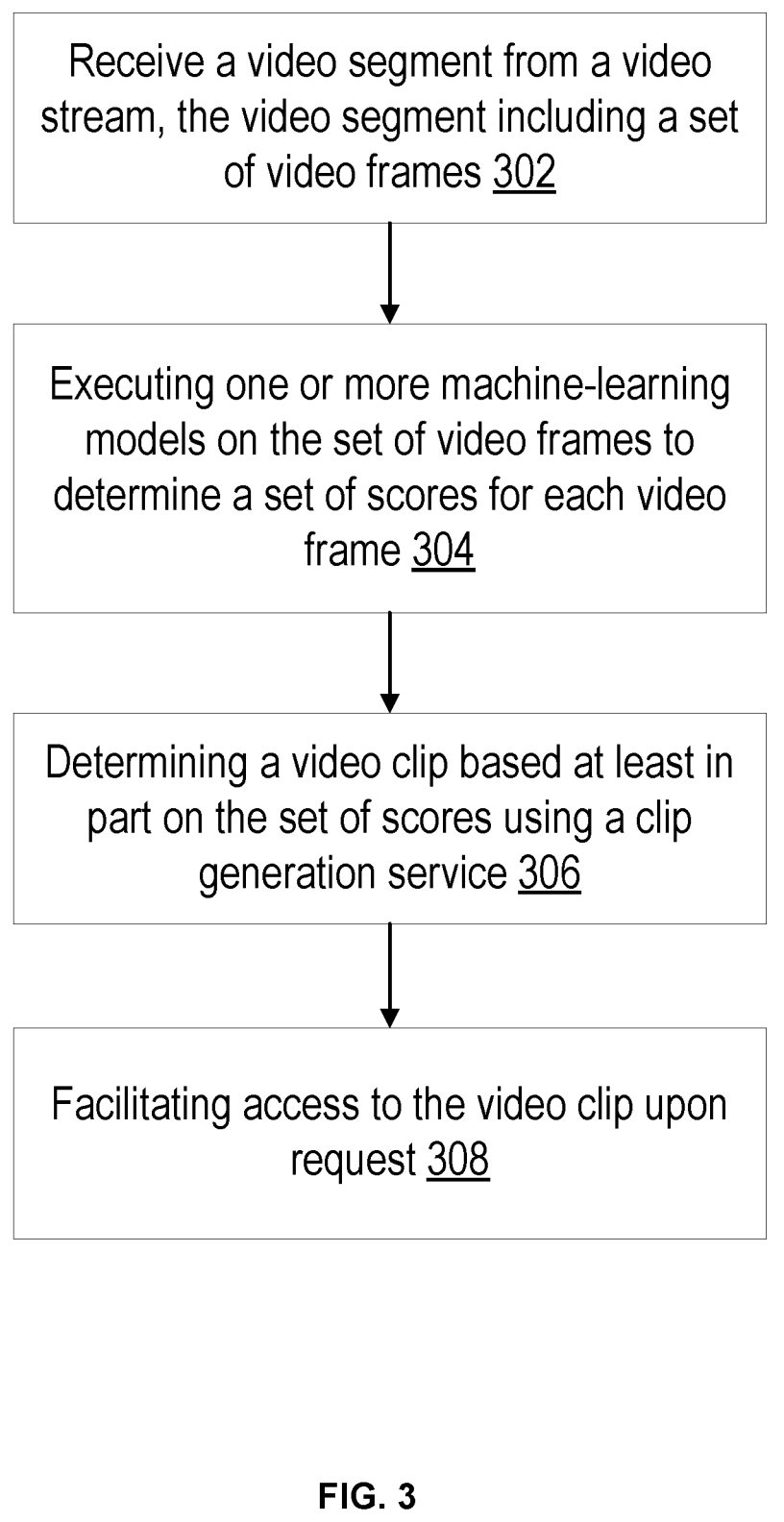

Receive a video segment from a video stream, the video segment including a set of video frames 302

Executing one or more machine-learning models on the set of video frames to determine a set of scores for each video frame 304

Determining a video clip based at least in part on the set of scores using a clip generation service 306

Facilitating access to the video clip upon request 308

FIG. 3

Figure 4:
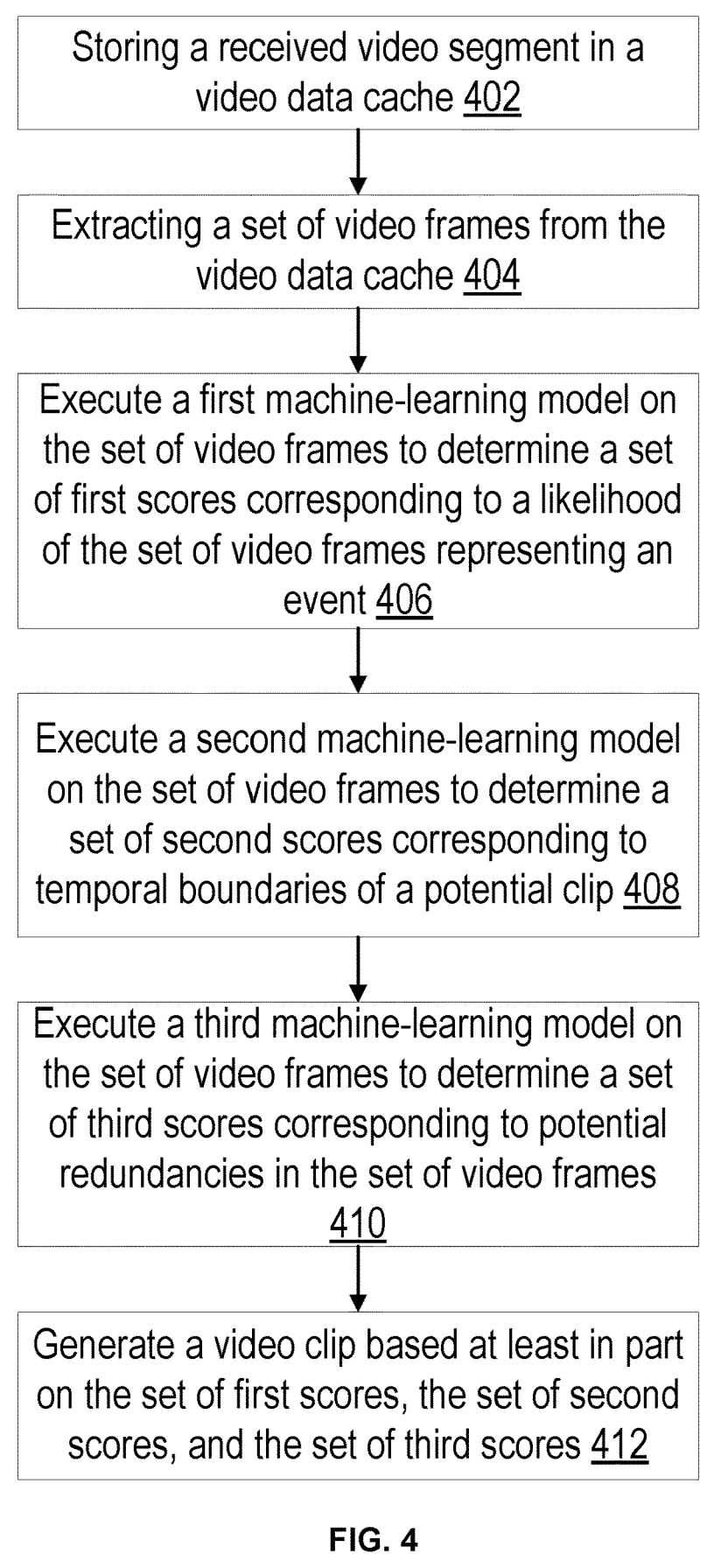

Storing a received video segment in a video data cache 402

↓

Extracting a set of video frames from the video data cache 404

↓

Execute a first machine-learning model on the set of video frames to determine a set of first scores corresponding to a likelihood of the set of video frames representing an event 406

↓

Execute a second machine-learning model on the set of video frames to determine a set of second scores corresponding to temporal boundaries of a potential clip 408

↓

Execute a third machine-learning model on the set of video frames to determine a set of third scores corresponding to potential redundancies in the set of video frames 410

↓

Generate a video clip based at least in part on the set of first scores, the set of second scores, and the set of third scores 412

Network

Web
Server

Application
Server

606

608

600

Production

Log

User
Information

610

612

614

616

CLIP GENERATION SERVICE FOR STREAMING CLIP GENERATION

BACKGROUND

Video data can be generated based on real-world events. For example, sporting events, such as a professional football game, a college baseball game, and the like can be filmed and streamed in real-time, such as via a traditional television broadcast. Entities, such as viewers, may miss important events represented by the video data, or may otherwise be interested in experiencing a portion of the video data more than one time. But, it is difficult to generate video clips based on real-time video data.

BRIEF DESCRIPTION OF THE DRAWINGS

Various embodiments in accordance with the present disclosure will be described with reference to the drawings, in which:

FIG. 3 illustrates a flowchart of a process for generating a video clip using a clip generation service;

FIG. 4 illustrates a flowchart of a process for generating scores using one or more machine-learning models to generate a video clip using a clip generation service in accordance with at least one embodiment;

DETAILED DESCRIPTION

Figure 1:
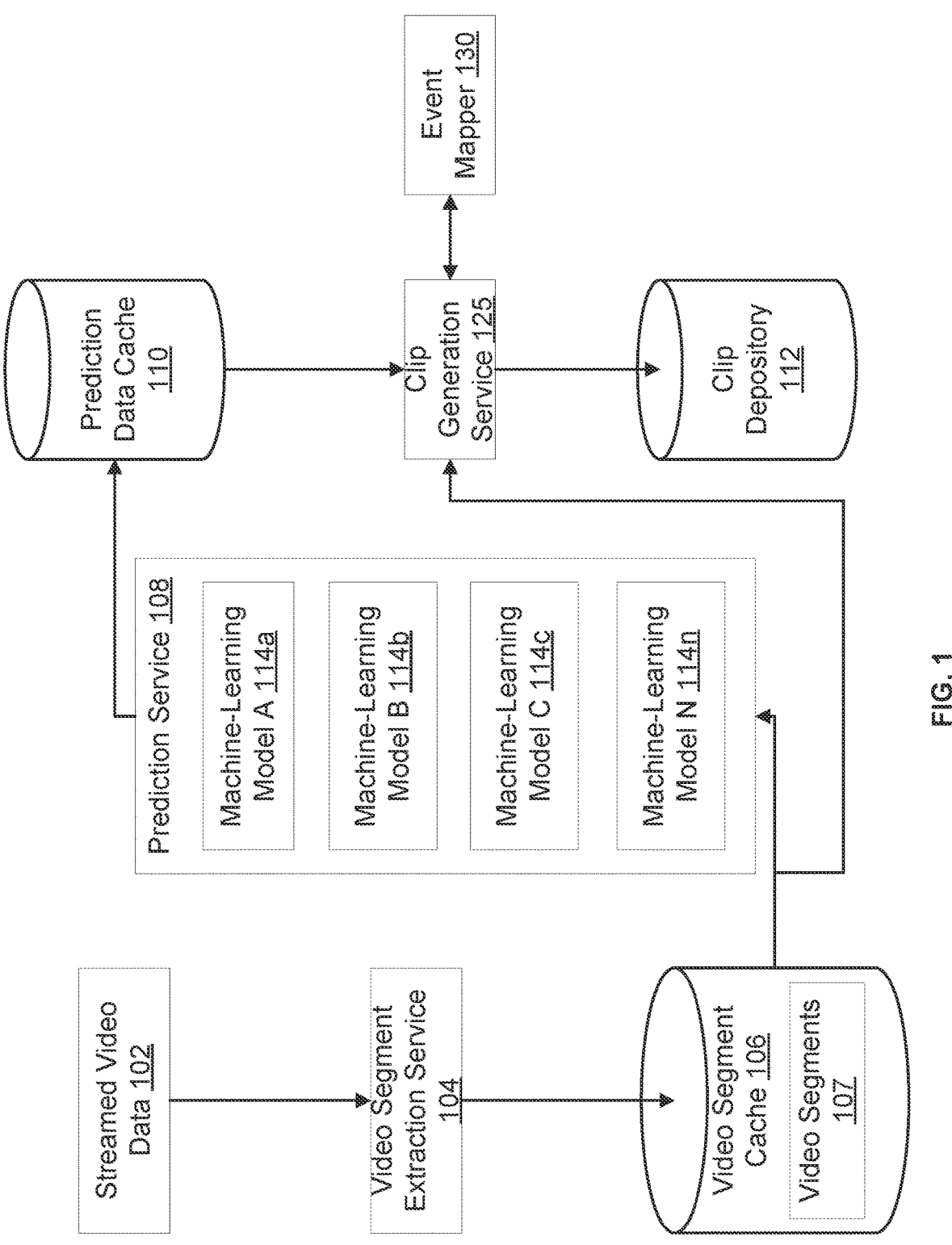
FIG. 1 illustrates a computing environment in which a video clip can be generated using a clip generation service in accordance with at least one embodiment.

In the following description, various embodiments will be described. For purposes of explanation, specific configurations and details are set forth in order to provide a thorough understanding of the embodiments. However, it will also be apparent to one skilled in the art that the embodiments may be practiced without the specific details. Furthermore, well-known features may be omitted or simplified in order not to obscure the embodiment being described.

Certain aspects and features of the present disclosure relate to a clip generation service that can be used to generate a video clip based on a video stream. The video stream may include live video data such as streaming video data from a live event. The video clip may include video data, such as one or more video frames, which may represent a real-world event, such as a sporting event, a political debate, a court proceeding, and the like, associated with the video stream. The clip generation service may generate the clip based at least in part on one or more scores determined for each video frame included in a video segment of the video stream. For example, a prediction service, which may include one or more machine-learning models, may determine the one or more scores for each video frame included in the video segment. The one or more scores may indicate a likelihood of the respective video frame including (i) at least one event, (ii) one or more potential temporal boundaries, and (iii) redundancies with respect to other video frames of the video segment. The clip generation service can generate the video clip to include (i) a first video frame being an initial temporal boundary of the video clip, (ii) a second video frame being a terminating temporal boundary of the video clip, and (iii) a third video frame being temporally between the first video frame and the second video frame. In some examples, the third video frame may represent an event indicated by the prediction service. The clip generation service, or any other suitable computing system or computing device, may provide access to the video clip upon request.

In a particular example, a live sporting event may be broadcast or otherwise live-streamed. The live sporting event may be or include an American football game, which may be live-streamed with video data. The live-streamed video data may be segmented into discrete video segments substantially contemporaneous with respect to streaming the video data. For example, during the live-stream of the American football game, each 60 seconds of video data may be discretized into a different video segment that can be used for generating a video clip. For each video segment, a prediction service may extract each video frame of a set of video frames included in the video segment. For example, if the video segment includes 3,600 video frames, then the prediction service may extract each video frame of the 3,600 video frames and may perform one or more operations on the 3,600 video frames. The prediction service may include one or more machine-learning models. Additionally or alternatively, the prediction service may be communicatively coupled with the one or more machine-learning models, which may be hosted on or otherwise provided by a separate computing system.

The prediction service can execute the one or more machine-learning models, for example sequentially, partially asynchronously or partially in parallel, asynchronously and/or in parallel, to generate one or more scores for each video frame. For example, the prediction service can execute a first machine-learning model, a second machine-learning model, and a third machine-learning model, though any other suitable number (e.g., less than three or more than three) of machine-learning models can be used by the prediction service. The first machine-learning model may receive a video frame as input and may generate a first score that may indicate a likelihood of an event being represented by the video frame. In examples in which the video frame is associated with American football, the event may include a kickoff, a snap, a touchdown, and the like. The second machine-learning model may receive a video frame as input and may generate a second score that may indicate a likelihood of at least one temporal boundary being represented by the video frame. The video frame may represent a temporal boundary if the second machine-learning model indicates that a camera change, a camera angle change, or a camera position change may have occurred. A temporal boundary may be an initial video frame of a potential video clip, a terminating video frame of a video clip, etc. The third machine-learning model may receive a video frame as input and may generate a third score that may indicate a likelihood of the video frame being redundant with any other video frame included in the video segment. The prediction service can use the one or more machine-learning models to generate the one or more scores and can store the extracted video frames in a data repository such that the one or more scores are associated with the extracted video frames.

The clip generation service can access the data repository or can otherwise receive the extracted video frames and the one or more scores. The clip generation service can evaluate the one or more scores for each video frame of the extracted video frames and can identify one or more video frames of the extracted video frames. For example, the clip generation service can identify a first video frame that indicates an initial temporal boundary of a potential video clip. The initial temporal boundary may be a first chronological video frame and may be one, two, three, four, five, or more video frames before a subsequent video frame that may represent an event. In a particular example, the clip generation service can identify the first video frame as being a few video frames prior to a video frame representing a snap in American football. Additionally, the clip generation service can identify a second video frame that indicates a terminating temporal boundary of a potential video clip. The terminating temporal boundary may be a last chronological video frame and (i) may be one video frame, two video frames, three video frames, four video frames, five video frames, six video frames, seven video frames, or more video frames before a subsequent video frame that may represent a different initial temporal boundary of a separate potential video clip or (ii) may be one second, two seconds, three seconds, four seconds, five seconds, six seconds, seven seconds, or more seconds after the video frame that may represent the event. In a particular example, the clip generation service can identify the second video frame as being a few seconds after a video frame representing a snap in American football. Additionally, the clip generation service can identify a third video frame that represents an event such as a snap in American football. The third video frame may be temporally between the first video frame and the second video frame. The clip generation service can concatenate the video frames from the first video frame to the second video frame to generate the video clip, and the clip generation service can provide access to the video clip upon request.

Techniques described herein include generating a video clip using a clip generation service. At least one video segment of a stream of video data can be received. The at least one video segment can include a set of video frames from the stream of video data. A set of machine-learning models can be executed for each video frame of the set of video frames. For example, a first machine-learning model can be executed to determine a first score of a set of first scores. The first score can indicate a likelihood that the video frame represents at least one event. A second machine-learning model can be executed to determine a second score of a set of second scores. The second score can indicate a likelihood that the video frame represents one or more potential temporal boundaries. A third machine-learning model can be executed to determine a third score of a set of third scores. The third score can indicate a likelihood that the video frame is redundant with respect to one or more other video frames of the set of video frames. Each video frame of the set of video frames can be stored in a predicted data cache such that each video frame of the set of video frames is associated with (i) a corresponding first score of the set of first scores, (ii) a corresponding second score of the set of second scores, and (iii) a corresponding third score of the set of third scores. A clip generation service can determine a video clip that includes at least a subset of the set of video frames based at least in part on (i) the set of first scores, (ii) the set of second scores, and (iii) the set of third scores. The video clip can include a first video frame of the set of video frames, a second video frame of the set of video frames, and a third video frame of the set of video frames. The first video frame can be an initial temporal boundary of the video clip. The second video frame can be a terminating temporal boundary of the video clip. The third video frame can be temporally between the first video frame and the second video frame, and the third video frame can represent an event indicated by the set of first scores, the set of second scores, and/or the set of third scores. Access to the video clip can be facilitated upon request.

FIG. 1 illustrates a computing environment 100 in which a video clip can be generated using a clip generation service 125 in accordance with at least one embodiment. As illustrated in FIG. 1, the computing environment 100 can include streamed video data 102, a video segment extraction service 104, a video segment cache 106, a prediction service 108, a prediction data cache 110, a clip generation service 125, and a clip depository 112. The computing environment 100 may include any additional or alternative components, features, and the like for generating a video clip using the clip generation service 125. The streamed video data 102 may originate from a television broadcast, from a live-streamed real-world event, or from any other suitable source of live video data. The streamed video data 102 may continuously or periodically be transmitted to the video segment extraction service 104. For example, the streamed video data 102 may be substantially contemporaneously broadcast or streamed (i) to users interested in the live-streamed real-world event and (ii) to the video segment extraction service 104. In some examples, the streamed video data 102 may be transmitted every less-than-one minute, every one minute, every two minutes, every three minutes, every four minutes, or every more minutes to the video segment extraction service 104.

The video segment extraction service 104 may receive the streamed video data 102 and may generate one or more video segments based at least in part on the streamed video data 102. The video segment extraction service 104 may discretize the streamed video data 102 into one or more video segments. For example, the video segment extraction service 104 may receive streamed video data 102 that is approximately four minutes long, and the video segment extraction service 104 can generate three or four discrete video segments by breaking up the four-minute-long streamed video data. The video segment extraction service 104 can store each generated video segment in the video segment cache 106, which may be or include a data repository that may be configured to store video data, as video segments 107. The video segment cache 106 may be communicative coupled with or otherwise accessible to the prediction service 108.

The prediction service 108 may receive the video segments 107 from the video segment cache 106. For example, the prediction service 108 may make an application programming interface (API) call to the video segment cache 106 to access and receive the video segments 107. Additionally or alternatively, a separate computing device may cause the video segments 107 to be transmitted from the video segment cache 106 to the prediction service 108. The prediction service 108 may extract each video frame that may be included in the video segments 107. For example, and for a particular video segment of the video segments 107 that includes 4,000 video frames, the prediction service 108 can receive the particular video segment and can extract each video frame of the 4,000 video frames. The prediction service 108 may be configured to make predictions or perform other suitable operations with respect to the extracted video frames.

The prediction service 108 may include or otherwise be configured to execute one or more machine-learning models to make one or more predictions about the extracted video frames. For example, and as illustrated in FIG. 1, the prediction service 108 may include machine-learning model A 114a, machine-learning model B 114b, machine-learning model C 114c, and machine-learning model N 114n, where "N" represents an unbounded number of potential machine-learning models. Each machine-learning model included in the prediction service 108 may be or include a deep-learning neural network such as a residual network, a temporal shift model, and the like. In some examples, other types of machine-learning models, such as convolutional neural networks, recurrent neural networks, and the like, may be included in the prediction service 108. Each machine-learning model included in the prediction service 108 may be configured to receive at least one video frame as input and to output at least one score or other information about the at least one video frame. For example, machine-learning model A 114a may be configured to receive a video frame and determine a first score for the video frame such that the first score may indicate a likelihood of the video frame representing an event such as a snap in American football, a ruling in a court case, an important line in a political debate, etc. Additionally or alternatively, machine-learning model B 114b may be configured to receive a video frame and determine a second score for the video frame such that the second score may indicate a likelihood of the video frame representing a temporal boundary of a potential video clip. The temporal boundary may be or include a camera change, a camera angle change, a camera position change, and the like for the video frame. Additionally or alternatively, machine-learning model C 114c may be configured to receive a video frame and determine a third score for the video frame such that the third score may indicate a likelihood of the video frame being redundant with respect to other video frames analyzed by machine-learning model C 114c. Machine-learning model N 114n may receive a video frame and may determine any other suitable score for the video frame that may be useful for generating a video clip using the video frame.

The prediction service 108 can determine the one or more scores for the extracted video frames and can store the one or more scores and the extracted video frames in the prediction data cache 110. The prediction data cache 110 may be or include a data repository that can store data and metadata. The prediction data cache 110 may be communicatively coupled with, or otherwise accessible over a communication network with respect to, the prediction service 108, and the prediction service 108 may transmit the extracted video frames and the one or more scores to the prediction data cache 110 to be stored together. In some examples, transmitting the extracted video frames and the one or more scores associated therewith to the prediction data cache 110 may involve storing the extracted video frames and the one or more scores together such that each video frame of the extracted video frames is associated with at least one corresponding score determined by the prediction service 108. In a particular example, the prediction service 108 may generate three scores, such as the first score, the second score, and the third score, for a particular video frame, and the prediction service 108 may transmit the particular video frame to the prediction data cache 110 for storage. The prediction data cache 110 may store the particular video frame such that, upon a separate computing system or separate computing service accessing the particular video frame, the three scores are also accessible and associated with the particular video frame.

The prediction data cache 110 may be communicatively coupled with, or otherwise accessible over a communication network with respect to, the clip generation service 125. For example, the clip generation service 125 may access the prediction data cache 110 to receive one or more video frames, and associated scores, stored therein. Additionally or alternatively, the clip generation service 125 can access the video segment cache 106 to access or otherwise receive the video segments 107. In some examples, the clip generation service 125 may access an event mapper 130 that can be used to identify the one or more video frames, a time of the one or more video frames, and other suitable metadata about the one or more video frames. The clip generation service 125 can receive the one or more video frames to generate a video clip. In some examples, the clip generation service 125 may receive each video frame, and associated scores, of a particular video segment, and the clip generation service 125 can determine whether to generate a video clip using the video frames of the video segment. The clip generation service 125 can evaluate a first type of score (e.g., the first score) associated with the video frames. The first type of score may indicate a likelihood that a respective video frame may represent an event. If the clip generation service 125 determines that at least one video frame has a first type of score exceeding a threshold or otherwise indicating that an event is likely to represent an event, then the clip generation service 125 may proceed to generate a video clip using the video frames. In some examples, if the clip generation service 125 determines that at least one video frame does not have a first type of score exceeding a threshold or otherwise indicating that an event is likely to represent an event, then the clip generation service 125 may not proceed to generate a video clip and may access video frames of a different video segment or await another set of video frames to be transmitted. In some examples, if two or more events are identified within the video frames, then the clip generation service 125 may not proceed to generate a video clip and may access video frames of a different video segment or await another set of video frames to be transmitted.

The clip generation service 125 can additionally evaluate a second type of score associated with the video frames, for example in response to determining that at least one video frame has a first type of score indicating that the at least one video frame is likely to represent an event. The second type of score may indicate whether the respective video frame is likely to represent an initial temporal boundary of a potential video clip and/or a terminating temporal boundary of the potential video clip. If the clip generation service 125 determines that at least two video frames have a second type of score exceeding a threshold or otherwise indicating that the at least two video frames are likely to represent temporal boundaries, then the clip generation service 125 may identify (i) a first video frame of the at least two video frames as an initial temporal boundary video frame and (ii) a second video frame of the at least two video frames as a terminating temporal boundary video frame. If the clip generation service 125 determines that at least two video frames do not have a second type of score exceeding a threshold or otherwise indicating that the at least two video frames are likely to represent temporal boundaries, then the clip generation service 125 may not proceed to generate a video clip and may access video frames of a different video segment or await another set of video frames to be transmitted.

In some examples, the clip generation service 125 can generate a video clip based at least in part on a first video frame, a second video frame, and a third video frame. The first video frame may have been determined by the clip generation service 125 to represent an initial temporal boundary, the second video frame may have been determined by the clip generation service 125 to represent a terminating temporal boundary, and the third video frame may have been determined by the clip generation service 125 to represent an event. The third video frame may be temporally between the first video frame and the second video frame. For example, the first video frame may represent a first point in time, the third video frame may represent a second point in time after the first point in time, and the second video frame may represent a third point in time after the first point in time and the second point in time. The clip generation service 125 may concatenate each video frame from the first video frame to the second video frame to generate the video clip, and the clip generation service 125 can transmit the video clip to the clip depository 112 for storage and for facilitating other suitable operations involving the video clip. In some examples, the clip generation service 125 may transmit the video clip to a separate computing device that can be used to further refine the video clip, to decide whether to use and/or store the video clip, and the like, for example prior to storing the video clip in the clip depository 112.

The clip depository 112 may be configured to store generated video clips, to provide on-demand access to the generated video clips, and the like. For example, the clip generation service 125 can generate a particular video clip, and the particular video clip can be stored in the clip depository 112. A user of a computing device may access the clip depository 112, and the user may select the particular video clip. The clip depository 112 may provide access to the user to the particular video clip upon request, for example by the user. In a particular example, a sporting event can be live-streamed, and a user can access a user interface that provides the live-streamed sporting event. The clip generation service 125 can generate a video clip of the sporting event based at least in part on live-streamed video data, and the clip generation service 125 can store the video clip in the clip depository 112, which may be displayed on a side portion of the user interface. Upon being stored in the clip depository 112, the video clip, or a still image or thumbnail thereof, may be displayed on the side portion of the user interface to facilitate access to the video clip upon request.

Figure 2:
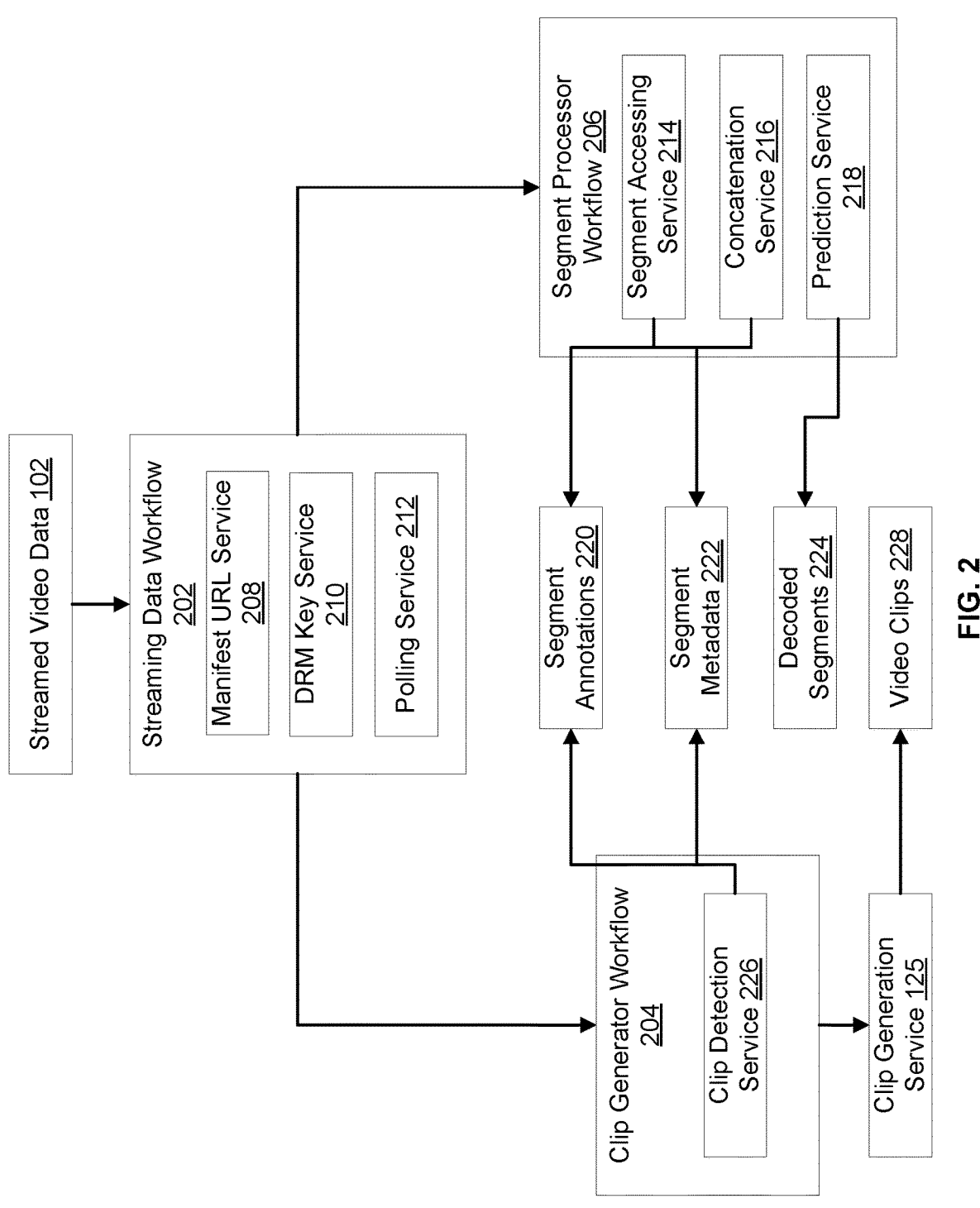
FIG. 2 illustrates a data flow for generating a video clip using a clip generation service in accordance with at least one embodiment.

FIG. 2 illustrates a block diagram 200 of data flow for generating a video clip using a clip generation service 125 in accordance with at least one embodiment. As illustrated in FIG. 2, the block diagram 200 can include streamed video data 102, a streaming data workflow 202, a clip generator workflow 204, a segment processor workflow 206, and a clip generation service 125. The block diagram 200 may include any additional or alternative components, features, and the like for generating a video clip using the clip generation service 125. The streamed video data 102 may originate from a television broadcast, from a live-streamed real-world event, or from any other suitable source of live video data. The streamed video data 102 may continuously or periodically be transmitted to the streaming data workflow 202. For example, the streamed video data 102 may be substantially contemporaneously broadcast or streamed (i) to users interested in the live-streamed real-world event and (ii) to the streaming data workflow 202. In some examples, the streamed video data 102 may be transmitted every less-than-one minute, every one minute, every two minutes, every three minutes, every four minutes, or every more minutes to the streaming data workflow 202.

The streaming data workflow 202 may include a manifest URL service 208, a digital rights management (DRM) key service 210, and a polling service 212, though any other or additional components or services can be included in or otherwise used by the streaming data workflow 202. The manifest URL service 208 may be configured to access or otherwise receive a manifest URL for each video segment transmitted to the streaming data workflow 202. The manifest URL may be or include a link to a separate file, such as an XML file or other suitable type of file, which may provide details about the corresponding video segment. For example, the manifest URL may be or include a link to metadata about the corresponding video segment detailing the time of the corresponding video segment, a source of the corresponding video segment, and the like. The DRM key service 210 may be configured to access or otherwise provide a key for accessing each video segment transmitted to the streaming data workflow 202. Each video segment transmitted to the streaming data workflow 202 may be encrypted or may otherwise have restrictions that prevent certain entities from accessing the video segment. The DRM key service 210 can access or otherwise receive a DRM key that can decrypt or otherwise provide access to the video segment to allow the video segment to be viewed, to allow the video segment to be analyzed, to allow operations to be performed with respect to the video segment, and the like. The polling service 212 may allow the streaming data workflow 202 to be communicatively coupled with the clip generator workflow 204 and the segment processor workflow 206. In some examples, the polling service 212 may continuously transmit, periodically transmit, or transmit on-demand, data from the streaming data workflow 202 to the clip generator workflow 204 and/or the segment processor workflow 206.

The segment processor workflow 206 may include a segment accessing service 214, a concatenation service 216, and a prediction service 218, which may be similar or identical to the prediction service 108 illustrated and described with respect to FIG. 1. The segment processor workflow 206 may include or execute other or additional suitable components and/or services. The segment accessing service 214 can receive video segments from the streaming data workflow 202, for example via the polling service 212. In some examples, the segment accessing service 214 may be configured to extract each video frame from each video segment transmitted to the segment processor workflow 206. In some examples, the segment accessing service 214 may determine, from each video frame extracted from the video segments, and/or from each video segment transmitted to the segment processor workflow 206, (i) segment annotations 220 and (ii) segment metadata 222. The segment annotations 220 and/or the segment metadata 222 may provide additional information about the respective video segments or any video frame included therein. The concatenation service 216 may be configured to access the segment annotations 220 and/or the segment metadata 222 and to concatenate two or more video frames extracted from the video segments received by the segment processor workflow 206. The prediction service 218 may determine one or more scores for the extracted video frames or decoded video segments 224. For example, the prediction service 218 may execute one or more machine-learning models to determine the scores for the decoded video segments 224.

The clip generator workflow 204 may include a clip detection service 226 that can be executed to identify one or more sets of video frames that can be used to generate one or more video clips such as video clips 228. The clip detection service 226 may access or otherwise receive the segment annotations 220 and/or the segment metadata 222. In some examples, the segment annotations 220 and/or the segment metadata 222 may include the scores determined by the prediction service 218. The clip detection service 226 can determine if a particular video segment, or the video frames included therein, can be used to generate a video clip. For example, the clip detection service 226 can evaluate one or more types of scores of each video frame included in the particular video segment to determine if at least one video frame is likely to represent an event, if at least two video frames are likely to represent temporal boundaries, and the like. The clip detection service 226 can transmit the particular video segment, or an indication thereof, to the clip generation service 125 to generate the video clip. For example, the clip generation service 125, or the concatenation service 216, may cause the video frames of the video clip to be aggregated, and the clip generation service 125 can store the video clip with the video clips 228, in a data repository, such as the clip depository 112, and the like.

FIG. 3 illustrates a flowchart of a process 300 for generating a video clip using a clip generation service 125. Some or all of the process 300, or any other processes described herein, or variations, and/or combinations thereof, may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some examples, some or all of the process 300 may be performed by the clip generation service 125 and/or the prediction service 108. Additionally or alternatively, while the operations of the process 400 are described in a particular order, the operations are not limited to this order and may be performed in any other suitable order including at least partially asynchronously or in parallel.

At block 302, the process 300 involves receiving a video segment from a video stream. The video segment may include a set of video frames or other suitable video data. The video stream may be or include a live-streamed sporting event, a live-streamed court proceeding, a live-streamed speech, and the like. The video stream may include, or may eventually include, a set of video segments, and each video segment of the set of video segments may be received, for example, chronologically. In some examples, the video segment can be stored in a data repository, such as the video segment cache 106, that is configured to store real-time-received video segments for further processing. Additionally or alternatively, one or more video frames can be extracted from the video segment. For example, a prediction service 108 can extract a set of video frames from the video segment.

At block 304, the process 300 involves executing one or more machine-learning models on the set of video frames to determine a set of scores for each video frame of the set of video frames. In some examples, the prediction service 108 can include or otherwise execute the one or more machine-learning models to determine the set of scores. The one or more machine-learning models can include one or more deep learning neural networks, one or more convolutional neural networks, one or more recurrent neural networks, or any other suitable architectures for the one or more machine-learning models. The one or more machine-learning models can each be configured to receive a video frame as input and output at least one score characterizing the video frame. In a particular example, a first machine-learning model can receive a particular video frame and determine a first score, a second machine-learning model can receive the particular video frame and determine a second score, and a third machine-learning model can receive the particular video frame and determine a third score. The first score may indicate a likelihood that the particular video frame represents an event such as a snap in American football, a pitch in baseball, an eagle in golf, etc. The second score may indicate a likelihood that the particular video frame represents a temporal boundary such as an initial temporal boundary of a potential video clip or a terminating temporal boundary of the potential video clip. The temporal boundary may be or include a camera change, a camera angle change, a camera position change, and the like for the video frame. In other examples, the temporal boundary may be a fixed amount of time prior to and/or subsequent to a video frame that may be identified to represent an event. The third score may indicate a likelihood that the particular video frame represents redundant material with respect to other video frames of the set of video frames. The set of video frames can be stored in a data repository, such as the prediction data cache 110, associated with a corresponding set of scores.

At block 306, the process 300 involves determining a video clip based at least in part on the set of scores. In some examples, the clip generation service 125 can be used to determine the video clip using the set of video frames and/or the set of scores. The clip generation service 125 can receive the set of video frames and the set of scores associated with the set of video frames. The clip generation service 125 can evaluate the set of scores to determine whether the set of video frames represents an event, whether the set of video frames represents one or more temporal boundaries, whether the set of video frames represents redundant subject material, and the like. The clip generation service 125 can identify a first video frame as an initial temporal boundary of the video clip, can identify a second video frame as a terminating temporal boundary of the video clip, and can identify a third video frame as representing an event. The third video frame may be temporally between the first video frame and the second video frame. Additionally, the clip generation service 125 can concatenate video frames from the first video frame to the second video frame to generate the video clip. The clip generation service 125 can transmit the video clip to a data repository, such as the clip depository 112, to store the video clip for future use.

At block 308, the process 300 involves facilitating access to the video clip upon request. For example, the video clip can be accessible on demand such as during or following a sporting event associated with the live-streamed video data. The video clip may be stored in the clip depository 112, which may be accessible to a user of a computing device. The computing device may connect, such as over a communication network (e.g., the Internet, a local area network (LAN), etc.), to the clip depository 112 or to a separate computing device or a separate computing service that may be configured to provide access to the contents of the clip depository 112. The user may provide input indicating a request for access to the video clip, and the clip depository 112, or any computing system or computing service associated therewith, can provide access to the video clip.

FIG. 4 illustrates a flowchart of a process 400 for generating scores using one or more machine-learning models to generate a video clip using a clip generation service in accordance with at least one embodiment. Some or all of the process 400, or any other processes described herein, or variations, and/or combinations thereof, may be performed under the control of one or more computer systems configured with executable instructions and may be implemented as code (e.g., executable instructions, one or more computer programs, or one or more applications) executing collectively on one or more processors, by hardware or combinations thereof. The code may be stored on a computer-readable storage medium, for example, in the form of a computer program comprising a plurality of instructions executable by one or more processors. The computer-readable storage medium may be non-transitory. In some examples, some or all of the process 400 may be performed by the clip generation service 125 and/or the prediction service 108. Additionally or alternatively, while the operations of the process 400 are described in a particular order, the operations are not limited to this order and may be performed in any other suitable order including at least partially asynchronously or in parallel.

At block 402, the process 400 involves storing a received video segment in a video segment cache. The video segment cache may be similar or identical to the video segment cache 106 illustrated and described with respect to FIG. 1. The received video segment may be transmitted to the video segment cache by a computing system that may additionally be broadcasting or otherwise live-streaming video data. The computing system may discretize the live-streamed video data into short video segments that may be approximately or less than five to approximately or larger than 500 seconds in length.

At block 404, the process 400 involves extracting a set of video frames from the video data cache. A prediction service, such as the prediction service 108 illustrated and described with respect to FIG. 1, may access the video segment cache to extract the set of video frames. For example, the prediction service may access the video segment cache to receive a particular video segment. The prediction service may identify or otherwise extract a set of video frames included in the particular video segment. The prediction service may iteratively extract sets of video frames for each video segment transmitted to or otherwise stored in the video segment cache.

At block 406, the process 400 involves executing a first machine-learning model on the set of video frames. The first machine-learning model may be or include a deep learning neural network. Additionally or alternatively, the first machine-learning model may include a convolutional neural network, a recurrent neural network, or any other suitable type of machine-learning model. The first machine-learning model may be configured to receive a video frame as an input and output a first type of score that indicates a first likelihood that the video frame represents an event. The prediction service may input the set of video frames into the first machine-learning model, or may otherwise execute the first machine-learning model, to determine a first set of scores for the set of video frames. In some examples, the first set of scores may be or include the first type of score.

At block 408, the process 400 involves executing a second machine-learning model on the set of video frames. The second machine-learning model may be or include a deep learning neural network. Additionally or alternatively, the second machine-learning model may include a convolutional neural network, a recurrent neural network, or any other suitable type of machine-learning model. The second machine-learning model may be configured to receive a video frame as an input and output a second type of score that indicates a second likelihood that the video frame represents a temporal boundary such as an initial temporal boundary or a terminating temporal boundary. The prediction service may input the set of video frames into the second machine-learning model, or may otherwise execute the second machine-learning model, to determine a second set of scores for the set of video frames. In some examples, the second set of scores may be or include the second type of score.

At block 410, the process 400 involves executing a third machine-learning model on the set of video frames. The third machine-learning model may be or include a deep learning neural network. Additionally or alternatively, the third machine-learning model may include a convolutional neural network, a recurrent neural network, or any other suitable type of machine-learning model. The third machine-learning model may be configured to receive a video frame as an input and output a third type of score that indicates a third likelihood that the video frame represents redundant subject matter with respect to other video frames. The prediction service may input the set of video frames into the third machine-learning model, or may otherwise execute the third machine-learning model, to determine a third set of scores for the set of video frames. In some examples, the third set of scores may be or include the third type of score.

At block 412, the process 400 involves generating a video clip based at least in part on the first set of scores, the second set of scores, and the third set of scores. A clip generation service, such as the clip generation service 125 illustrated and described with respect to FIG. 1, can receive the set of video frames, the first set of scores, the second set of scores, the third set of scores, and any other suitable data for generating the video clip. The clip generation service 125 may evaluate the first set of scores, the second set of scores, and the third set of scores (i) to determine if at least one video frame of the set of video frames represents an event, (ii) to determine if at least one video frame of the set of video frames represents an initial temporal boundary, and (iii) to determine if at least one video frame of the set of video frames represents a terminating temporal boundary. If the clip generation service 125 determines, for example based at least in part on the first set of scores, that a video frame of the set of video frames represents an event, then the clip generation service 125 may proceed to evaluate the second set of scores. If the clip generation service 125 determines, for example based at least in part on the second set of scores, that two or more video frames of the set of video frames represent temporal boundaries around the event, then the clip generation service 125 may proceed to evaluate the third set of scores. And, If the clip generation service 125 determines, for example based at least in part on the third set of scores, that a number of video frames of the set of video frames exceeding (or not exceeding) a threshold represents redundant subject matter, then the clip generation service 125 may proceed to generate the video clip. The clip generation service 125 may generate the video clip by concatenating a subset of the set of video frames that extends temporally from a first video frame (e.g., an initial temporal boundary) to a second video frame (e.g., a terminating temporal boundary). The clip generation service 125 can transmit the video clip to a separate computing system or a separate computing service to be further refined and/or can transmit the video clip to a data repository, such as the clip depository 112, to be provided upon request.

Figure 5:
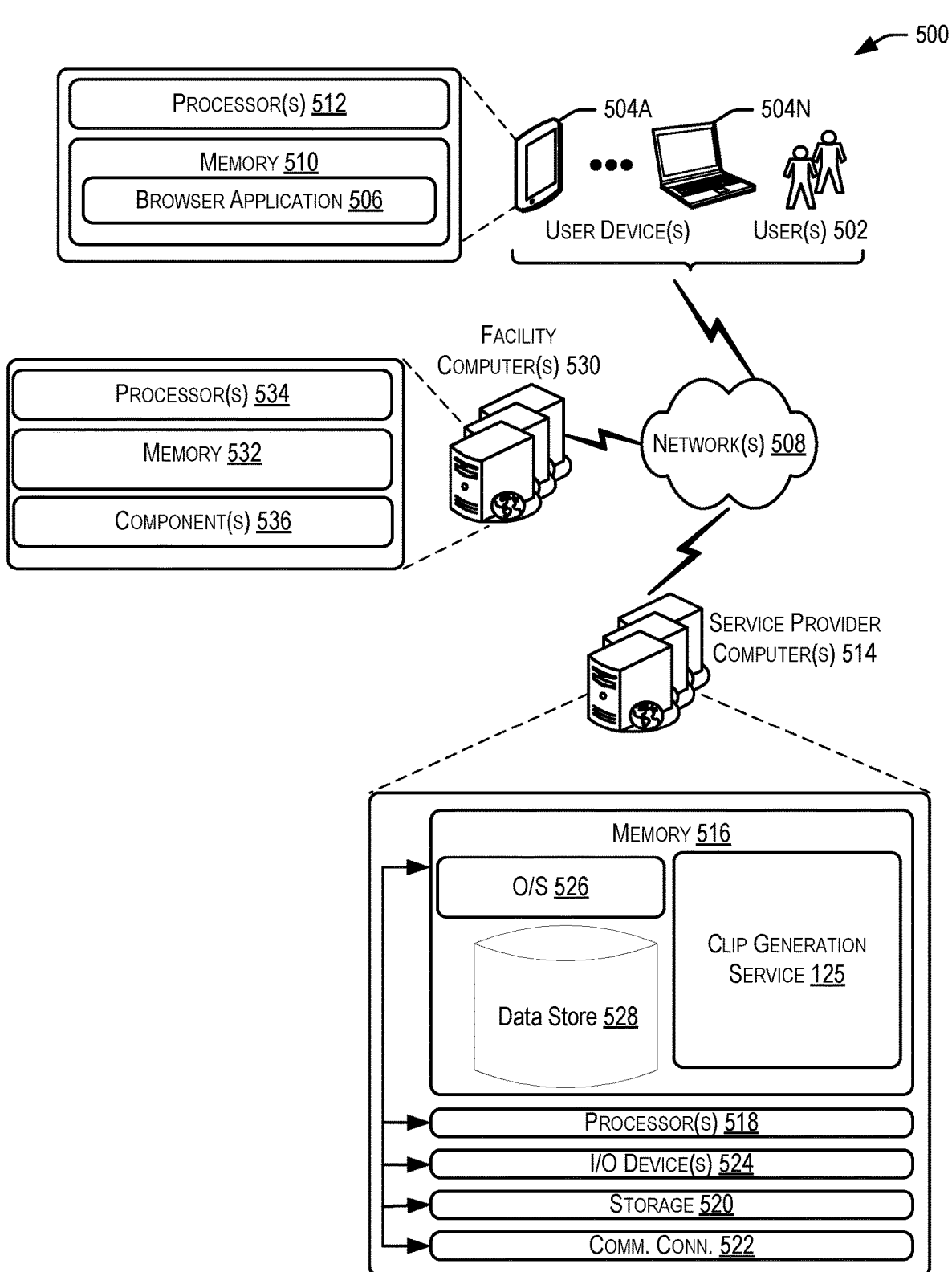
FIG. 5 illustrates an example architecture for a clip generation service that includes one or more service provider computers, a user device, and one or more facility computers in accordance with at least one embodiment.

FIG. 5 illustrates an example of an architecture 500 for a clip generation service, such as the clip generation service 125, that includes one or more service provider computers, a user device, and one or more facility computers in accordance with at least one embodiment. In the architecture 500, one or more users 502, such as video editors and/or entities associated with computer systems implementing the camera position service 250, may utilize user computing devices 504A-N (collectively, user devices 504) to access a browser application 506 or a user interface (UI) that can be accessed through the browser application 506 and via one or more networks 508, to receive text data, image data, video data, or the like, which may be presented and interacted with via browser application 506 or the UI accessible through the browser application 506. The "browser application" 506 can be or include any browser control or native application that can access and/or display a network page or other information. A native application may include an application or program that has been developed for use on a particular platform, such as an operating system, or a particular device such as a particular type of mobile device.

In accordance with at least one embodiment, the user devices 504 may be configured for communicating with service provider computers 514 and facility computers 530 via networks 508. The user devices 504 may include at least one memory, such as memory 510, and one or more processing units or one or more processors 512. The memory 510 may store program instructions that are loadable and executable on the one or more processors 512, as well as data generated during the execution of these programs. Depending on the configuration and type of the user devices 504, the memory 510 may be volatile, such as random access memory (RAM), and/or non-volatile such as read-only memory (ROM), flash memory, etc. The user devices 504 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the user devices 504. In some implementations, the memory 510 may include multiple different types of memory, such as static random access memory (SRAM), dynamic random access memory (DRAM), ROM, etc.

Turning to the contents of the memory 510 in more detail, the memory 510 may include an operating system and one or more application programs or services for implementing the features disclosed herein. Additionally or alternatively, the memory 510 may include one or more services for implementing the features described herein such as the clip generation service 125.

The architecture 500 may additionally include one or more service provider computers 514 that may, in some examples, provide computing resources such as, but not limited to, client entities, low latency data storage, durable data storage, data access, management, virtualization, hosted computing environment or "cloud-based" solutions, clip generation feature implementation, etc. The service provider computers 514 may implement or be an example of one or more machine-learning models or one or more service provider computers (e.g., the computing devices) described herein, for example, with reference to FIGS. 1-4 and/or throughout the disclosure. The one or more service provider computers 514 may also be operable to provide site hosting, computer application development, and/or implementation platforms, combinations of the foregoing, or the like to the one or more users 502 via user devices 504.

In some examples, the networks 508 may include any one or a combination of many different types of networks, such as cable networks, the Internet, wireless networks, cellular networks, and other private and/or public networks. While the illustrated examples represent the users 502 communicating with the service provider computers 514 over the networks 508, the described techniques may equally apply in instances where the users 502 interact with the one or more service provider computers 514 via the one or more user devices 504 over a landline phone, via a kiosk, or in any other manner. It is also noted that the described techniques may apply in other client/server arrangements, such as set-top boxes, etc., as well as in non-client/server arrangements such as locally stored applications, peer-to-peer arrangements, etc. In embodiments, the users 502 may communicate with the facility computers 530 via networks 508, and the facility computers 530 may communicate with the service provider computers 514 via networks 508. In some embodiments, the service provider computers 514 may communicate, via networks 508, with one or more third party computers (not illustrated) to obtain data inputs for the various algorithms of the generation features described herein. In accordance with at least one embodiment, the service provider computers 514 may receive text data, video data, image data, one or more scores, or the like for at least generating a video clip.

The one or more service provider computers 514 may be or include any type of computing devices such as, but not limited to, a mobile phone, a smart phone, a personal digital assistant (PDA), a laptop computer, a desktop computer, a server computer, a thin-client device, a tablet PC, etc. Additionally, it should be noted that in some embodiments, the one or more service provider computers 514 may be executed by one or more virtual machines implemented in a hosted computing environment. The hosted computing environment may include one or more rapidly provisioned and released computing resources, which computing resources may include computing, networking, and/or storage devices. A hosted computing environment may also be referred to as a cloud computing environment or a distributed computing environment. In some examples, the one or more service provider computers 514 may be in communication with the user device 504 via the networks 508, or via other network connections. The one or more service provider computers 514 may include one or more servers, which may be arranged in a cluster or as individual servers not associated with one another. In embodiments, the service provider computers 514 may be in communication with one or more third party computers (not illustrated) via networks 508 to receive or to otherwise obtain data including text data, video data, image data, one or more scores, or the like for at least generating a video clip.

In one illustrative configuration, the one or more service provider computers 514 may include at least one memory, such as memory 516, and one or more processing units or one or more processors 518. The one or more processors 518 may be implemented as appropriate in hardware, computer-executable instructions, firmware, or any combination thereof. Computer-executable instruction or firmware implementations of the one or more processors 518 may include computer-executable or machine-executable instructions written in any suitable programming language to perform the various functions described when executed by a hardware computing device such as a processor. The memory 516 may store program instructions that are loadable and executable on the one or more processors 518, as well as data generated during the execution of these programs. Depending on the configuration and type of the one or more service provider computers 514, the memory 516 may be volatile, such as RAM, and/or non-volatile such as ROM, flash memory, etc. The one or more service provider computers 514 or servers may also include additional storage 520, which may include removable storage and/or non-removable storage. The additional storage 520 may include, but is not limited to, magnetic storage, optical disks and/or tape storage. The disk drives and their associated computer-readable media may provide non-volatile storage of computer-readable instructions, data structures, program services, and other data for the computing devices. In some implementations, the memory 516 may include multiple different types of memory, such as SRAM, DRAM, ROM, etc.

The memory 516, the additional storage 520, removable and/or non-removable, are examples of non-transitory computer-readable storage media. For example, computer-readable storage media may include volatile or non-volatile, removable or non-removable media implemented in any method or technology for storage of information such as computer-readable instructions, data structures, program services, or other data. The memory 516 and the additional storage 520 are examples of non-transitory computer storage media. Additional types of non-transitory computer storage media that may be present in the one or more service provider computers 514 may include, but are not limited to, PRAM, SRAM, DRAM, RAM, ROM, EEPROM, flash memory or other memory technology, CD-ROM, DVD, or other optical storage, magnetic cassettes, magnetic tape, magnetic disk storage or other magnetic storage devices, or any other medium which can be used to store the desired information and which can be accessed by the one or more service provider computers 514. Combinations of any of the above should also be included within the scope of non-transitory computer-readable media.

The one or more service provider computers 514 may also include one or more communication connection interfaces 522 that can allow the one or more service provider computers 514 to communicate with a data store, another computing device or server, user terminals, and/or other devices on the networks 508. The one or more service provider computers 514 may also include one or more I/O devices 524, such as a keyboard, a mouse, a pen, a voice input device, a touch input device, a display, speakers, a printer, etc.

Turning to the contents of the memory 516 in more detail, the memory 516 may include an operating system 526, one or more data stores 528, and/or one or more application programs or services for implementing the features disclosed herein including the clip generation service 125. The architecture 500 includes facility computers 530. In embodiments, the service provider computers 514 and the clip generation service 125 may be configured to generate and transmit instructions, via networks 508, to components 536 in communication or otherwise associated with facility computers 530. For example, the instructions may be configured to activate or otherwise trigger the components 536 for transmitting a video clip determined by the clip generation service 125. The facility computers 530 may include at least one memory, such as memory 532, and one or more processing units or one or more processors 534. The memory 532 may store program instructions, which may include one or more machine-learning models as disclosed herein, that can be loaded and executed on the one or more processors 534, as well as data generated during the execution of these programs. Depending on the configuration and type of the facility computers 530, the memory 532 may be volatile, such as random access memory (RAM), and/or non-volatile such as read-only memory (ROM), flash memory, etc. The facility computers 530 may also include additional removable storage and/or non-removable storage including, but not limited to, magnetic storage, optical disks, and/or tape storage. The disk drives and their associated non-transitory computer-readable media may provide non-volatile storage of computer-readable instructions, data structures, program services, and other data for the facility computers 530. In some implementations, the memory 532 may include multiple different types of memory, such as static random access memory (SRAM), dynamic random access memory (DRAM), ROM, etc.

Turning to the contents of the memory 532 in more detail, the memory 532 may include an operating system and one or more application programs or services for implementing the features disclosed herein. Additionally, the memory 532 may include one or more services for implementing the features described herein including the clip generation service 125. In some embodiments, the service provider computers 514 and the clip generation service 125 may determine a video clip based at least in part on one or more sets of scores determined by one or more machine-learning models for a set of video frames. The user device 504 and the browser application 506 may be configured to transmit the output to the user 502 or to otherwise facilitate access of the output by the user 502. In accordance with at least one embodiment, the clip generation service 125 may be configured to receive one or more video frames, one or more sets of scores corresponding to the one or more video frames, and the like. In some embodiments, some, a portion, or all of these input data may be stored and transmitted as text files, image files, video files, or other files including text data, image data, video data, etc. In some embodiments, the clip generation service 125 may be configured to implement one or more machine-learning models, computer models, computer algorithms, etc., to generate the video clip or perform other suitable tasks.

The clip generation service 125 may be configured to generate and transmit a user interface or data objects for updating a user interface presented via browser application 506 and user device 504 for presenting the video clip, or any components thereof or associated therewith to the user 502. Other graphical updates, feedback mechanisms, and data object generation associated with the clip generation features described herein may be implemented by the service provider computers 514 and/or the clip generation service 125.

Figure 6:
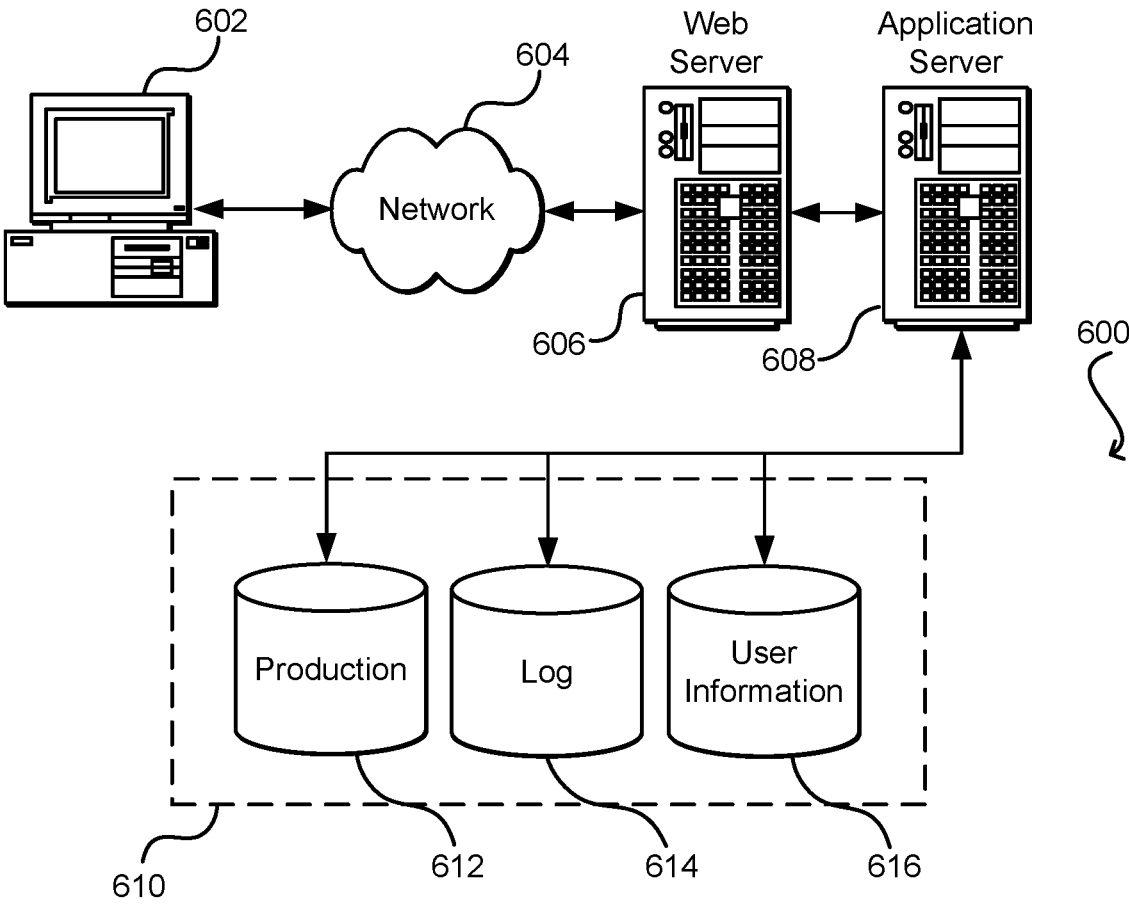
FIG. 6 illustrates an environment in which various embodiments can be implemented.

FIG. 6 illustrates aspects of an example of an environment 600 for implementing aspects in accordance with various embodiments. As will be appreciated, although a Web-based environment is used for purposes of explanation, different environments may be used, as appropriate, to implement various embodiments. The environment includes an electronic client device 602, which can include any appropriate device operable to send and receive requests, messages, or information over an appropriate network 604 and convey information back to a user of the device. Examples of such client devices include personal computers, cell phones, handheld messaging devices, laptop computers, set-top boxes, personal data assistants, electronic book readers, and the like. The network can include any appropriate network, including an intranet, the Internet, a cellular network, a local area network, or any other such network or combination thereof. Components used for such a system can depend at least in part upon the type of network and/or environment selected. Protocols and components for communicating via such a network are well known and will not be discussed herein in detail. Communication over the network can be enabled by wired or wireless connections and combinations thereof. In this example, the network includes the Internet, as the environment includes a Web server 606 for receiving requests and serving content in response thereto, although for other networks an alternative device serving a similar purpose could be used as would be apparent to one of ordinary skill in the art.

The illustrative environment includes at least one application server 608 and a data store 610. It should be understood that there can be several application servers, layers, or other elements, processes, or components, which may be chained or otherwise configured, which can interact to perform tasks such as obtaining data from an appropriate data store. As used herein the term "data store" refers to any device or combination of devices capable of storing, accessing, and retrieving data, which may include any combination and number of data servers, databases, data storage devices, and data storage media, in any standard, distributed, or clustered environment. The application server can include any appropriate hardware and software for integrating with the data store as needed to execute aspects of one or more applications for the client device, handling a majority of the data access and business logic for an application. The application server provides access control services in cooperation with the data store and is able to generate content such as text, graphics, audio, and/or video to be transferred to the user, which may be served to the user by the Web server in the form of HyperText Markup Language ("HTML"), Extensible Markup Language ("XML"), or another appropriate structured language in this example. The handling of all requests and responses, as well as the delivery of content between the client device 602 and the application server 608, can be handled by the Web server. It should be understood that the Web and application servers are not required and are merely example components, as structured code discussed herein can be executed on any appropriate device or host machine as discussed elsewhere herein.

The data store 610 can include several separate data tables, databases or other data storage mechanisms and media for storing data relating to a particular aspect. For example, the data store illustrated includes mechanisms for storing production data 612 and user information 616, which can be used to serve content for the production side. The data store also is shown to include a mechanism for storing log data 614, which can be used for reporting, analysis, or other such purposes. It should be understood that there can be many other aspects that may need to be stored in the data store, such as for page image information and to access right information, which can be stored in any of the above listed mechanisms as appropriate or in additional mechanisms in the data store 610. The data store 610 is operable, through logic associated therewith, to receive instructions from the application server 608 and obtain, update or otherwise process data in response thereto. In one example, a user might submit a search request for a certain type of item. In this case, the data store might access the user information to verify the identity of the user and can access the catalog detail information to obtain information about items of that type. The information then can be returned to the user, such as in a results listing on a Web page that the user is able to view via a browser on the user device 602. Information for a particular item of interest can be viewed in a dedicated page or window of the browser.

Each server typically will include an operating system that provides executable program instructions for the general administration and operation of that server and typically will include a computer-readable storage medium (e.g., a hard disk, random access memory, read only memory, etc.) storing instructions that, when executed by a processor of the server, allow the server to perform its intended functions.

Suitable implementations for the operating system and general functionality of the servers are known or commercially available and are readily implemented by persons having ordinary skill in the art, particularly in light of the disclosure herein.

The environment in one embodiment is a distributed computing environment utilizing several computer systems and components that are interconnected via communication links, using one or more computer networks or direct connections. However, it will be appreciated by those of ordinary skill in the art that such a system could operate equally well in a system having fewer or a greater number of components than are illustrated in FIG. 6. Thus, the depiction of the environment 600 in FIG. 6 should be taken as being illustrative in nature and not limiting to the scope of the disclosure.

The various embodiments further can be implemented in a wide variety of operating environments, which in some cases can include one or more user computers, computing devices or processing devices which can be used to operate any of a number of applications. User or client devices can include any of a number of general purpose personal computers, such as desktop or laptop computers running a standard operating system, as well as cellular, wireless, and handheld devices running mobile software and capable of supporting a number of networking and messaging protocols. Such a system also can include a number of workstations running any of a variety of commercially-available operating systems and other known applications for purposes such as development and database management. These devices also can include other electronic devices, such as dummy terminals, thin-clients, gaming systems, and other devices capable of communicating via a network.

Most embodiments utilize at least one network that would be familiar to those skilled in the art for supporting communications using any of a variety of commercially-available protocols, such as Transmission Control Protocol/Internet Protocol ("TCP/IP"), Open System Interconnection ("OSI"), File Transfer Protocol ("FTP"), Universal Plug and Play ("UpnP"), Network File System ("NFS"), Common Internet File System ("CIFS"), and AppleTalk. The network can be, for example, a local area network, a wide-area network, a virtual private network, the Internet, an intranet, an extranet, a public switched telephone network, an infrared network, a wireless network, and any combination thereof.

In embodiments utilizing a Web server, the Web server can run any of a variety of server or mid-tier applications, including Hypertext Transfer Protocol ("HTTP") servers, FTP servers, Common Gateway Interface ("CGI") servers, data servers, Java servers, and business application servers. The server(s) also may be capable of executing programs or scripts in response to requests from user devices, such as by executing one or more Web applications that may be implemented as one or more scripts or programs written in any programming language, such as JavaR, C, C#, or C++, or any scripting language, such as Perl, Python, or TCL, as well as combinations thereof. The server(s) may also include database servers, including without limitation those commercially available from Oracle®, Microsoft®, Sybase®, and IBM®.

The environment can include a variety of data stores and other memory and storage media as discussed above. These can reside in a variety of locations, such as on a storage medium local to (and/or resident in) one or more of the computers or remote from any or all of the computers across the network. In a particular set of embodiments, the information may reside in a storage-area network ("SAN") familiar to those skilled in the art. Similarly, any necessary files for performing the functions attributed to the computers, servers, or other network devices may be stored locally and/or remotely, as appropriate. Where a system includes computerized devices, each such device can include hardware elements that may be electrically coupled via a bus, the elements including, for example, at least one central processing unit ("CPU"), at least one input device (e.g., a mouse, keyboard, controller, touch screen, or keypad), and at least one output device (e.g., a display device, printer, or speaker). Such a system may also include one or more storage devices, such as disk drives, optical storage devices, and solid-state storage devices such as random access memory ("RAM") or read-only memory ("ROM"), as well as removable media devices, memory cards, flash cards, etc.

Such devices also can include a computer-readable storage media reader, a communications device (e.g., a modem, a network card (wireless or wired)), an infrared communication device, etc.), and working memory as described above. The computer-readable storage media reader can be connected with, or configured to receive, a computer-readable storage medium, representing remote, local, fixed, and/or removable storage devices as well as storage media for temporarily and/or more permanently containing, storing, transmitting, and retrieving computer-readable information. The system and various devices also typically will include a number of software applications, modules, services, or other elements located within at least one working memory device, including an operating system and application programs, such as a client application or Web browser. It should be appreciated that alternate embodiments may have numerous variations from that described above. For example, customized hardware might also be used and/or particular elements might be implemented in hardware, software (including portable software, such as applets), or both. Further, connection to other computing devices such as network input/output devices may be employed.

Storage media computer readable media for containing code, or portions of code, can include any appropriate media known or used in the art, including storage media and communication media, such as but not limited to volatile and non-volatile, removable and non-removable media implemented in any method or technology for storage and/or transmission of information such as computer readable instructions, data structures, program modules, or other data, including RAM, ROM, Electrically Erasable Programmable Read-Only Memory ("EEPROM"), flash memory or other memory technology, Compact Disc Read-Only Memory ("CD-ROM"), digital versatile disk (DVD), or other optical storage, magnetic cassettes, magnetic tape, magnetic disk storage, or other magnetic storage devices, or any other medium which can be used to store the desired information and which can be accessed by a system device. Based on the disclosure and teachings provided herein, a person of ordinary skill in the art will appreciate other ways and/or methods to implement the various embodiments.

The specification and drawings are, accordingly, to be regarded in an illustrative rather than a restrictive sense. It will, however, be evident that various modifications and changes may be made thereunto without departing from the broader spirit and scope of the disclosure as set forth in the claims.

Other variations are within the spirit of the present disclosure. Thus, while the disclosed techniques are susceptible to various modifications and alternative constructions, certain illustrated embodiments thereof are shown in the drawings and have been described above in detail. It should be understood, however, that there is no intention to limit the disclosure to the specific form or forms disclosed, but on the contrary, the intention is to cover all modifications, alternative constructions, and equivalents falling within the spirit and scope of the disclosure, as defined in the appended claims.

The use of the terms "a" and "an" and "the" and similar referents in the context of describing the disclosed embodiments (especially in the context of the following claims) are to be construed to cover both the singular and the plural, unless otherwise indicated herein or clearly contradicted by context. The terms "comprising," "having," "including," and "containing" are to be construed as open-ended terms (i.e., meaning "including, but not limited to,") unless otherwise noted. The term "connected" is to be construed as partly or wholly contained within, attached to, or joined together, even if there is something intervening. Recitation of ranges of values herein are merely intended to serve as a shorthand method of referring individually to each separate value falling within the range, unless otherwise indicated herein and each separate value is incorporated into the specification as if it were individually recited herein. All methods described herein can be performed in any suitable order unless otherwise indicated herein or otherwise clearly contradicted by context. The use of any and all examples, or exemplary language (e.g., "such as") provided herein, is intended merely to better illuminate embodiments of the disclosure and does not pose a limitation on the scope of the disclosure unless otherwise claimed. No language in the specification should be construed as indicating any non-claimed element as essential to the practice of the disclosure.

Disjunctive language such as the phrase "at least one of X, Y, or Z," unless specifically stated otherwise, is intended to be understood within the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Preferred embodiments of this disclosure are described herein, including the best mode known to the inventors for carrying out the disclosure. Variations of those preferred embodiments may become apparent to those of ordinary skill in the art upon reading the foregoing description. The inventors expect skilled artisans to employ such variations as appropriate and the inventors intend for the disclosure to be practiced otherwise than as specifically described herein. Accordingly, this disclosure includes all modifications and equivalents of the subject matter recited in the claims appended hereto as permitted by applicable law. Moreover, any combination of the above-described elements in all possible variations thereof is encompassed by the disclosure unless otherwise indicated herein or otherwise clearly contradicted by context.

All references, including publications, patent applications, and patents, cited herein are hereby incorporated by reference to the same extent as if each reference were individually and specifically indicated to be incorporated by reference and were set forth in its entirety herein.

What is claimed is:

1. A computer-implemented method, comprising:
   receiving at least one video segment of a stream of video data, the at least one video segment comprising a plurality of video frames from the stream of video data;
   for each video frame of the plurality of video frames:

executing a first machine-learning model to determine a first score of a plurality of first scores, the first score indicating a likelihood that the video frame represents at least one event;

executing a second machine-learning model to determine a second score of a plurality of second scores, the second score indicating a likelihood that the video frame represents one or more potential temporal boundaries; and executing a third machine-learning model to determine a third score of a plurality of third scores, the third score indicating a likelihood that the video frame is redundant with respect to one or more other video frames of the plurality of video frames;

storing each video frame of the plurality of video frames in a predicted data cache such that each video frame of the plurality of video frames is associated with (i) a corresponding first score of the plurality of first scores, (ii) a corresponding second score of the plurality of second scores, and (iii) a corresponding third score of the plurality of third scores;

determining, by a clip generation service, a video clip that comprises a subset of the plurality of video frames based at least in part on (i) the plurality of first scores, (ii) the plurality of second scores, and (iii) the plurality of third scores, the video clip comprising:

a first video frame of the plurality of video frames, the first video frame being an initial temporal boundary of the video clip;

a second video frame of the plurality of video frames, the second video frame being a terminating temporal boundary of the video clip; and a third video frame of the plurality of video frames, the third video frame being temporally between the first video frame and the second video frame, the third video frame representing an event indicated by one or more of the plurality of first scores, the plurality of second scores, or the plurality of third scores; and facilitating access to the video clip upon request.

2. The computer-implemented method of claim 1, wherein the first machine-learning model, the second machine-learning model, and the third machine-learning model are each deep-learning neural networks.

3. The computer-implemented method of claim 1, wherein:

executing the first machine-learning model comprises executing the first machine-learning model to determine whether at least one video frame of the plurality of video frames represents the at least one event;

executing the second machine-learning model comprises executing the second machine-learning model to determine whether at least two video frames of the plurality of video frames represent at least two temporal boundaries with respect to the at least one event; and executing the third machine-learning model comprises executing the third machine-learning model to determine whether a non-negligible subset of the plurality of video frames are redundant with respect to other video frames of the plurality of video frames.

4. The computer-implemented method of claim 1, wherein determining the video clip comprises:

determining, for each video frame of the plurality of video frames, whether the video frame represents the at least one event by applying a first threshold value to the corresponding first score of the plurality of first scores;

determining, for each video frame of the plurality of video frames, whether the video frame represents the initial temporal boundary by applying a second threshold value to the corresponding second score of the plurality of second scores;

determining, for each video frame of the plurality of video frames, whether the video frame represents the terminating temporal boundary by applying a third threshold value to the corresponding second score of the plurality of second scores; and in response to determining the first video frame, the second video frame, and the third video frame, chronologically concatenating video frames of the plurality of video frames inclusively between the first video frame and the second video frame to generate the video clip.

5. A non-transitory computer-readable medium comprising instructions that are executable by a processing device for causing the processing device to perform operations comprising:

receiving at least one video segment of a stream of video data, the at least one video segment comprising a plurality of video frames from the stream of video data;

for each video frame of the plurality of video frames, executing a plurality of machine-learning models to determine likelihoods of the video frame representing (i) at least one event, (ii) one or more potential temporal boundaries, and (iii) redundancies with respect to other video frames of the plurality of video frames, the executing the plurality of machine-learning models comprising executing a first machine-learning model of the plurality of machine-learning models to determine a first score of a plurality of first scores, and the first score indicating a likelihood that a corresponding video frame of the plurality of video frames represents at least one event;

determining, by a clip generation service, a video clip that comprises a subset of the plurality of video frames based at least in part on the determined likelihoods, the video clip comprising:

a first video frame of the plurality of video frames, the first video frame being an initial temporal boundary of the video clip;

a second video frame of the plurality of video frames, the second video frame being a terminating temporal boundary of the video clip; and a third video frame of the plurality of video frames, the third video frame being temporally between the first video frame and the second video frame, the third video frame representing an event indicated by one or more of the determined likelihoods; and facilitating access to the video clip upon request.

6. The non-transitory computer-readable medium of claim 5, wherein the operation of executing the plurality of machine-learning models comprises executing a second machine-learning model of the plurality of machine-learning models to determine a second score of a plurality of second scores, the second score indicating a likelihood that a corresponding video frame of the plurality of video frames represents one or more potential temporal boundaries.

7. The non-transitory computer-readable medium of claim 6, wherein the operation of executing the plurality of machine-learning models comprises executing a third machine-learning model of the plurality of machine-learning models to determine a third score of a plurality of third scores, the third score indicating a likelihood that a corresponding video frame of the plurality of video frames is redundant with respect to one or more other video frames of the plurality of video frames.

8. The non-transitory computer-readable medium of claim 7, wherein:

the operation of executing the first machine-learning model comprises executing the first machine-learning model to determine whether at least one video frame of the plurality of video frames represents the at least one event;

the operation of executing the second machine-learning model comprises executing the second machine-learning model to determine whether at least two video frames of the plurality of video frames represent at least two temporal boundaries with respect to the at least one event; and the operation of executing the third machine-learning model comprises executing the third machine-learning model to determine whether a non-negligible subset of the plurality of video frames are redundant with respect to other video frames of the plurality of video frames.

9. The non-transitory computer-readable medium of claim 7, wherein the first machine-learning model, the second machine-learning model, and the third machine-learning model are each deep-learning neural networks.

10. The non-transitory computer-readable medium of claim 7, wherein the operations further comprise storing each video frame of the plurality of video frames in a predicted data cache such that each video frame of the plurality of video frames is associated with (i) a corresponding first score of the plurality of first scores, (ii) a corresponding second score of the plurality of second scores, and (iii) a corresponding third score of the plurality of third scores.

11. The non-transitory computer-readable medium of claim 10, wherein the operations further comprise storing the at least one video segment of the stream of video data in a video data cache, and wherein:

executing the plurality of machine-learning models comprises extracting each video frame of the plurality of video frames from the video data cache to execute the plurality of machine-learning models; and determining the video clip comprises extracting each video frame and (i) the plurality of first scores, (ii) the plurality of second scores, and (iii) the plurality of third scores from the predicted data cache for use by the clip generation service to generate the video clip.

12. The non-transitory computer-readable medium of claim 10, wherein determining the video clip comprises, for each video frame of the plurality of video frames stored in the predicted data cache:

determining whether the video frame represents the at least one event by applying a first threshold value to the corresponding first score of the plurality of first scores;

determining whether the video frame represents the initial temporal boundary by applying a second threshold value to the corresponding second score of the plurality of second scores; and determining whether the video frame represents the terminating temporal boundary by applying a third threshold value to the corresponding second score of the plurality of second scores.

13. The non-transitory computer-readable medium of claim 12, wherein determining the video clip further comprises in response to determining the first video frame, the second video frame, and the third video frame, chronologically concatenating video frames of the plurality of video frames inclusively between the first video frame and the second video frame to generate the video clip.

14. A computer system comprising:

a memory configured to store computer-executable instructions; and a processor in communication with the memory configured to execute the computer-executable instructions to perform operations comprising:

receiving at least one video segment of a stream of video data, the at least one video segment comprising a plurality of video frames from the stream of video data;

for each video frame of the plurality of video frames, executing a plurality of machine-learning models to determine likelihoods of the video frame representing (i) at least one event, (ii) one or more potential temporal boundaries, and (iii) redundancies with respect to other video frames of the plurality of video frames, the executing the plurality of machine-learning models comprising executing a first machine-learning model of the plurality of machine-learning models to determine a first score of a plurality of first scores, the first score indicating a likelihood that a corresponding video frame of the plurality of video frames represents at least one event;

determining, by a clip generation service, a video clip that comprises a subset of the plurality of video frames based at least in part on the determined likelihoods, the video clip comprising:

a first video frame of the plurality of video frames, the first video frame being an initial temporal boundary of the video clip;

a second video frame of the plurality of video frames, the second video frame being a terminating temporal boundary of the video clip; and a third video frame of the plurality of video frames, the third video frame being temporally between the first video frame and the second video frame, the third video frame representing an event indicated by one or more of the determined likelihoods; and facilitating access to the video clip upon request.

15. The system of claim 14, wherein the operation of executing the plurality of machine-learning models comprises:

executing a second machine-learning model of the plurality of machine-learning models to determine a second score of a plurality of second scores, the second score indicating a likelihood that a corresponding video frame of the plurality of video frames represents one or more potential temporal boundaries; and executing a third machine-learning model of the plurality of machine-learning models to determine a third score of a plurality of third scores, the third score indicating a likelihood that a corresponding video frame of the plurality of video frames is redundant with respect to one or more other video frames of the plurality of video frames.

16. The system of claim 15, wherein the first machine-learning model, the second machine-learning model, and the third machine-learning model are each deep-learning neural networks, and wherein:

the operation of executing the first machine-learning model comprises executing the first machine-learning model to determine whether at least one video frame of the plurality of video frames represents the at least one event;

the operation of executing the second machine-learning model comprises executing the second machine-learning model to determine whether at least two video frames of the plurality of video frames represent at least two temporal boundaries with respect to the at least one event; and the operation of executing the third machine-learning model comprises executing the third machine-learning model to determine whether a non-negligible subset of the plurality of video frames are redundant with respect to other video frames of the plurality of video frames.

17. The system of claim 15, wherein the operations further comprise storing each video frame of the plurality of video frames in a predicted data cache such that each video frame of the plurality of video frames is associated with (i) a corresponding first score of the plurality of first scores, (ii) a corresponding second score of the plurality of second scores, and (iii) a corresponding third score of the plurality of third scores.

18. The system of claim 17, wherein the operations further comprise storing the at least one video segment of the stream of video data in a video data cache, and wherein:

executing the plurality of machine-learning models comprises extracting each video frame of the plurality of video frames from the video data cache to execute the plurality of machine-learning models; and determining the video clip comprises extracting each video frame and (i) the plurality of first scores, (ii) the plurality of second scores, and (iii) the plurality of third scores from the predicted data cache for use by the clip generation service to generate the video clip.

19. The system of claim 17, wherein determining the video clip comprises:

determining, for each video frame of the plurality of video frames, whether the video frame represents the at least one event by applying a first threshold value to the corresponding first score of the plurality of first scores;

determining, for each video frame of the plurality of video frames, whether the video frame represents the initial temporal boundary by applying a second threshold value to the corresponding second score of the plurality of second scores;

determining, for each video frame of the plurality of video frames, whether the video frame represents the terminating temporal boundary by applying a third threshold value to the corresponding second score of the plurality of second scores; and in response to determining the first video frame, the second video frame, and the third video frame, chronologically concatenating video frames of the plurality of video frames inclusively between the first video frame and the second video frame to generate the video clip.

\* \* \* \* \*